United States Patent [19]

Lewis et al.

[11] 4,436,367
[45] Mar. 13, 1984

[54] OPTICAL SLIP RING ASSEMBLY

[75] Inventors: Norris E. Lewis, Christiansburg; Michael B. Miller, Blacksburg, both of Va.

[73] Assignee: Litton Systems, Inc., Blacksburg, Va.

[21] Appl. No.: 241,588

[22] Filed: Mar. 9, 1981

[51] Int. Cl.³ .............................................. G02B 7/26
[52] U.S. Cl. .............................. 350/96.20; 350/96.15
[58] Field of Search ............... 350/96.15, 96.20, 96.21, 350/96.22

[56] References Cited

U.S. PATENT DOCUMENTS

| | | | |
|---|---|---|---|
| 3,922,063 | 11/1975 | Marrone | 350/96.15 |
| 4,027,945 | 6/1977 | Iverson | 350/96.22 |
| 4,165,913 | 8/1979 | Fitch | 350/96.15 |
| 4,190,318 | 2/1980 | Upton, Jr. | 350/96.20 |
| 4,277,134 | 7/1981 | Upton, Jr. | 350/96.20 |
| 4,307,933 | 12/1981 | Palmer et al. | 350/96.15 X |
| 4,373,779 | 2/1983 | Dorsey | 350/96.21 |

FOREIGN PATENT DOCUMENTS 2732806  1/1979  Fed. Rep. of Germany ... 350/96.20

Primary Examiner—John D. Lee
Attorney, Agent, or Firm—Brian L. Ribando

[57] ABSTRACT

An optical slip ring assembly couples an optic signal from a rotating source to a stationary detector. The rotor of the optical slip ring comprises a rotor optic fiber having a first end coupled with the optic signal source and a second end portion having one side adapted to form a light-emitting area of a selected length. The stator comprises a plurality of stator fibers each having a first pickup end and a stator block for mounting the fiber pickup ends in a radially symmetric array opposite the light emitting area of the rotor whereby an optic signal transmitted from the source through the rotor fiber is picked up by the stator fibers.

11 Claims, 8 Drawing Figures

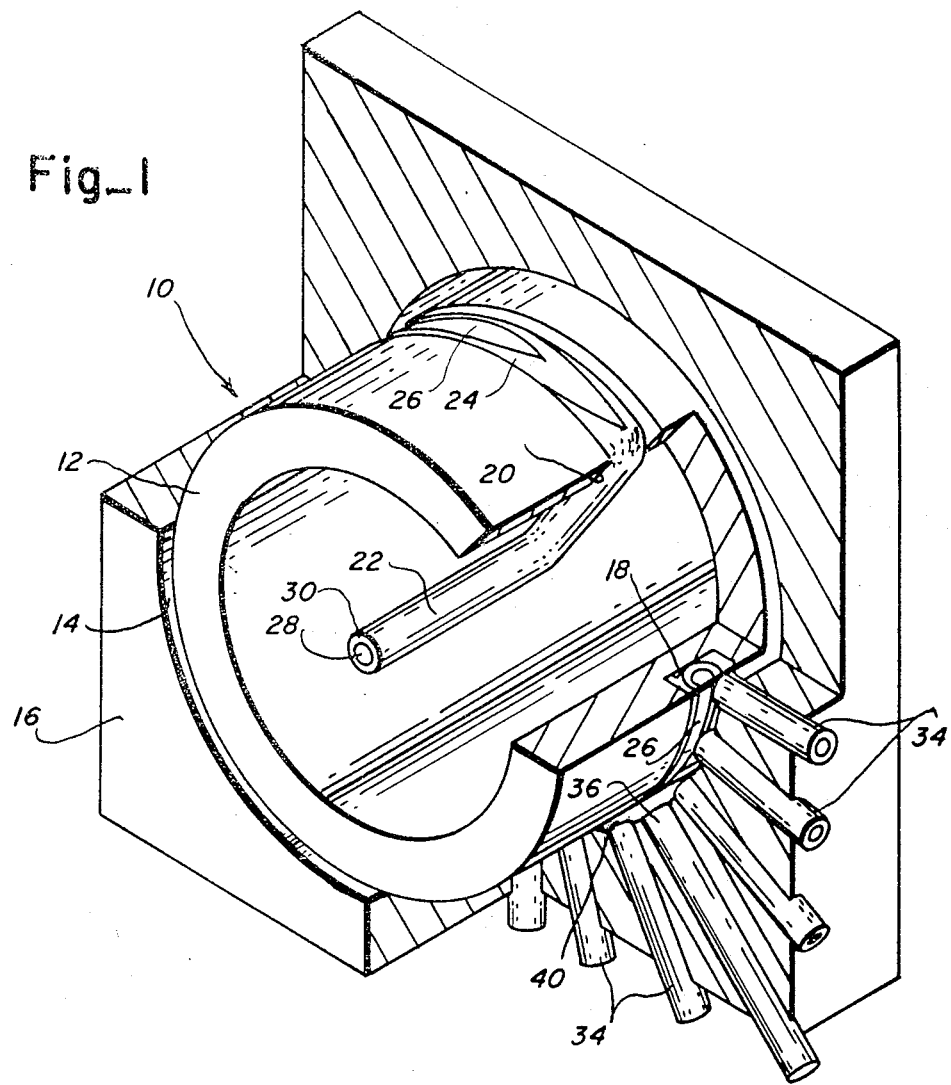
Fig_1
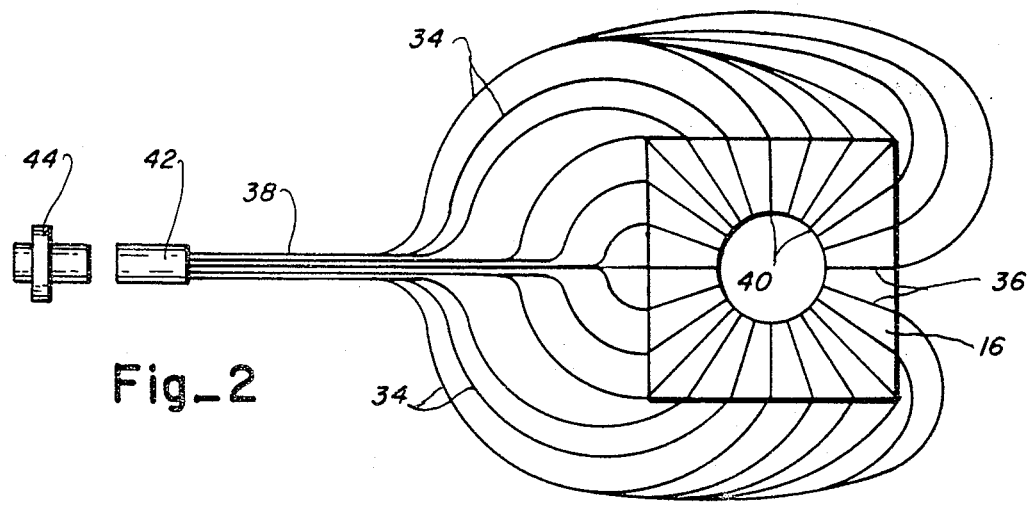
Fig_2

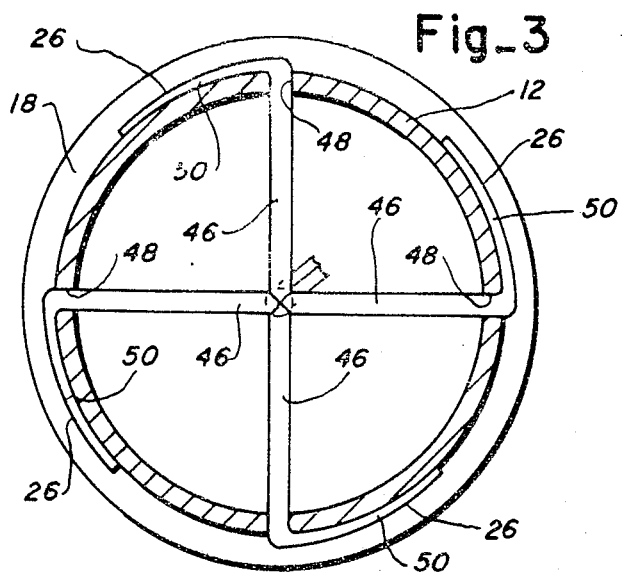
Fig_3
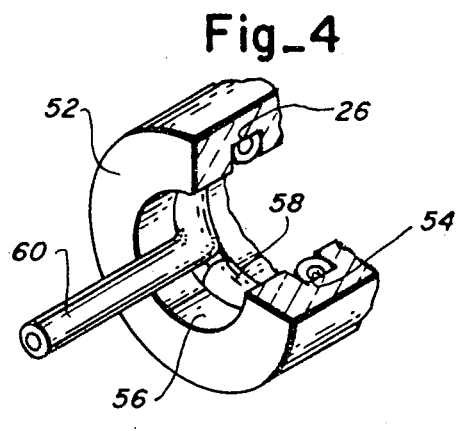
Fig_4
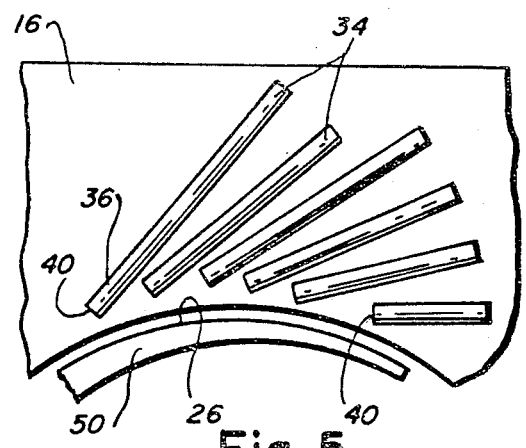
Fig_5
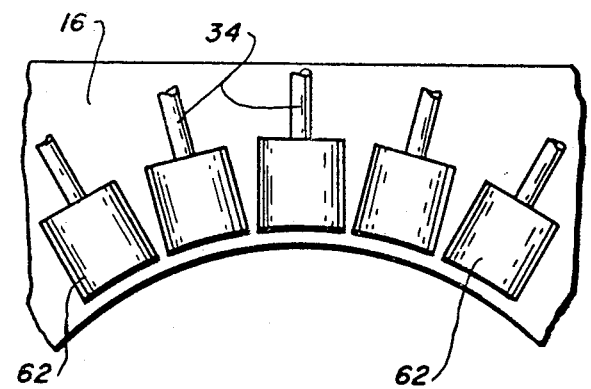
Fig_6
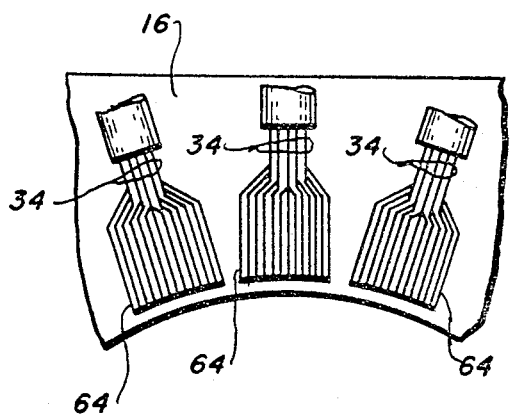
Fig_7
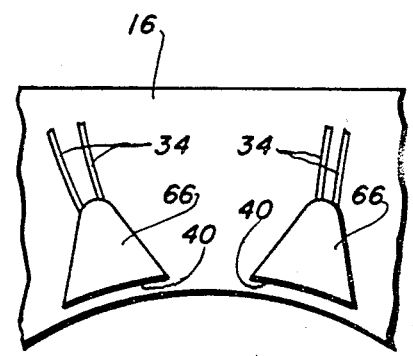
Fig_8

OPTICAL SLIP RING ASSEMBLY

This invention relates to optical slip ring assemblies.

Rotary optical joints or optical slip rings wherein a pair of optic fibers or fiber bundles are mounted in axial alignment for relative rotation are known in the art. It would be highly desirous to provide an optical slip ring assembly having a cylindrical construction to facilitate the use of multiple optical channels.

It is an object of the present invention to provide an optical slip ring assembly wherein an optical signal is radially transmitted between a rotor and stator to produce the optical coupling of the signal therebetween.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings:

FIG. 1 is a perspective view partially sectioned of an optical slip ring assembly according to the teachings of the present invention;

FIG. 2 is a schematic diagram of the stator optics of the optical slip ring assembly;

FIG. 3 is a front view of an alternate embodiment of the rotor assembly;

FIG. 4 is a perspective view partially sectioned of a second alternate embodiment of the rotor assembly; and FIGS. 5, 6, 7 and 8 are partial sectional views of alternate embodiments of the stator assembly.

As can be seen in FIG. 1, the optical slip ring assembly 10 generally comprises a rotor cylinder 12 which is mounted to rotate concentrically within the bore 14 of a stator mounting block 16. The rotor cylinder 12 has a circular groove 18 which communicates with the interior of the cylinder via a selectively sized aperture 20. An optic fiber 22 is secured with epoxy within the circular groove 18, passes through the aperture 20 into the cylinder interior, and extends to an optical signal source (not shown) for optical coupling therewith. The end portion 24 of the optic fiber 22 which is mounted in the circular groove is prepared on one side defining a light-emitting area 26 which faces radially outwardly.

The optic fiber comprises a plastic or silica core 28 sheathed within a plastic or silica cladding 30. The entire light-emitting area is illuminated by an optic signal transmitted through the fiber 22. This light-emitting region may be prepared by mechanically removing the surface via particle abrasion, scraping, ion milling or by chemical etching. In order to have the light emitted evenly over the length of the region, the surface is progressively removed so that both the width and depth of the removed area increase with length. In the preferred embodiment, the prepared area of the fiber is between one-quarter inch and two inches in length.

The stator assembly includes a plurality of optic fibers 34, each having a pick up end 36 and a second end grouped into a collective bundle 38, shown in FIG. 2. The pickup ends 36 of the stator fibers 34 are secured to the mounting block 16 in a radially symmetric, inwardly directed array arranged concentrically about the circular fiber groove 18 defining a pickup area 40 so that the light-emitting area 26 rotates concentrically therein. Accordingly, an optic signal transmitted from the source through the rotor fiber 22 is picked up by the stator fibers 34.

A lens 42, which is optically coupled to the collective bundle of fiber ends 38, focuses the optic signal picked up by the stator fibers 34 and couples the signal to the optic signal detector 44. In the preferred embodiment, a two milliwatt light-emitting diode is utilized as the signal source and a photo diode serves as a signal detector.

Fiber leads for a plurality of optical channels or electrical leads may be contained in the open center rotor 12 and a plurality of stator blocks may be ganged along a common axis to provide a plural channel assembly.

An alternate rotor embodiment, shown in FIG. 3, employs a plurality of rotor fibers 46 collectively coupled to a source (not shown). The fibers 46 pass, one each, through a plurality of apertures 48 in the cylinder 12 which communicate with the circular fiber groove 18 so that a light-emitting end portion 50 of each fiber is mounted within a selected arc thereof. Thus, the specially prepared end portions 50 of the fibers collectively define the light-emitting area 26. This embodiment is preferred for relatively large diameter rotor assemblies, such as greater than two inches.

A second alternate embodiment for the rotor assembly, shown in FIG. 4, employs a transparent washer 52 having a groove 54 around its interior circumferential wall 56. The prepared end portion 58 of the rotor fiber 60 is mounted within this groove having its light-emitting area 26 radially outwardly directed through the transparent washer 52. In this embodiment, the optic signal emitted from the rotor fiber 60 is transmitted through the transparent washer 52 and is picked up by the array of stator fibers. This embodiment is preferred for rotors having a relatively small diameter, such as within one-quarter to two inches.

Alternate embodiments for the stator assembly may be used to enhance the detection capability of the array of pickup fibers. It was discovered that most light tends to escape from the light-emitting area tangentially to the bend radius of the prepared surface. Accordingly, in one embodiment, shown in FIG. 5, the stator pickup fibers 34 are selectively angled so that each fiber end 36 comprising the pickup area 40 faces the light-emitting area 26 in the direction from which the greatest amount of light is emitted.

In a second alternate embodiment, shown in FIG. 6, graded index rod lenses 62 are used to pick up the optic signal from the rotor assembly and focus the signal directly into each fiber 34. This substantially increases the size of the pickup area 40 for the entire fiber array. In a third alternate embodiment, shown in FIG. 7, groups of stator fibers 34 are formed into blocks 64 with polished faces which enhance the pickup capability of the fibers. A fourth alternate embodiment, shown in FIG. 8, utilizes thin flat wedge-shaped transparent coupler blocks 66 each coupled to a pair of pickup fibers 34 to define the pickup area 40.

The amount of loss of optic signal intensity through the optical coupling is directly related to the size and number of fibers defining the light-emitting area and the size and number of fibers defining the portion of pickup area which is in direct alignment with the light-emitting area. In order to provide a substantially constant strength signal to the detector, the light-emitting area of the rotor assembly and the pickup area of the stator assembly are configured so that the percentage of the light-emitting area, which is in direct alignment with the pickup area, remains substantially constant during the rotation of the rotor within the stator. Thus, the stator fibers cumulatively pick up a substantially uniform signal regardless of the angular position of the rotor.

What is claimed is:

1. An optical slip ring assembly for coupling an optic signal from a rotor source to a stator detector, the assembly comprising:
   a rotor optic fiber having a first end for coupling with the optic signal source and a second end portion having one side progressively removed so that both the width and the depth of the removed area increases along the length of the fiber to form a light-emitting area of a selected length,
   cylindrical rotor means having a circular groove means for mounting said fiber second end portion therein so that said light-emitting area faces radially outwardly,
   a plurality of stator fibers each having a first pickup end,
   stator means for mounting said fiber pickup ends in a radially symmetric, selectively inwardly directed array concentrically about said circular groove means defining a pickup area so that said light-emitting area rotates concentrically therein whereby an optic signal transmitted from the source through the rotor fiber is picked up by said stator fibers, and
   each said stator fiber having a second end grouped in a collective bundle for coupling the optic signal picked up by said stator fibers to the stator detector, wherein said cylindrical rotor means comprises a transparent washer having a groove on its interior diameter wall which comprises said circular groove means whereby the optic signal emitted from said light-emitting area is transmitted radially through said transparent washer and is picked up by said array of pickup fiber ends, and wherein the length of said light-emitting area of said rotor fiber substantially equals the circumferential dimension of said circular groove means so that when said rotor fiber is mounted, said light-emitting area forms a circle.

2. An optical slip ring assembly according to claim 1, wherein said pickup ends of said stator fibers each comprises a lens for increasing the optical pickup capacity of each fiber thereby substantially increasing said pickup area.

3. An optical slip ring assembly according to claim 1, wherein said pickup ends are grouped into a radial symmetrical array of selectively inwardly directed multistrand fiber blocks which collectively comprise said pickup area.

4. An optical slip ring assembly according to claim 1 wherein said pickup ends include a radial symmetrical array of wedge-shaped coupler blocks, each coupled to at least one stator fiber which collectively comprise said pickup area.

5. An optical slip ring assembly according to claim 1 additionally comprising lens means optically coupled to said collective bundle of stator fiber second ends for focusing the optic signal picked up by said stator fibers for coupling the signal to the optic signal detector.

6. An optical slip ring assembly for coupling an optic signal from a rotor source to a stator detector, the assembly comprising:
   a rotor optic fiber having a first end for coupling with the optic signal source and a second end portion having one side progressively removed so that both the width and the depth of the removed area increases along the length of the fiber to form a light-emitting area of a selected length,
   cylindrical rotor means having a circular groove means for mounting said fiber second end portion therein so that said light-emitting area faces radially outwardly,
   a plurality of stator fibers each having a first pickup end, said pickup ends being grouped into a radial symmetric array of selectively inwardly directed multistrand fiber blocks which collectively comprise a pickup area,
   stator means for mounting said fiber pickup ends in said radially symmetric, selectively inwardly directed array concentrically about said circular groove means defining said pickup area so that said light-emitting area rotates concentrically therein whereby an optic signal transmitted from the source through the rotor fiber is picked up by said stator fibers, and
   each said stator fiber having a second end grouped in a collective bundle for coupling the optic signal picked up by said stator fibers to the stator detector.

7. An optical slip ring assembly for coupling an optic signal from a rotor source to a stator detector, the assembly comprising:
   a plurality of rotor optic fibers each having a first end for collective coupling with the optic signal source and a second end portion having one side progressively removed so that both the width and the depth of the removed area increases along the length of the fiber to form an area of a selected length from which light is emitted,
   cylindrical rotor means having a circular groove means for mounting said fiber second end portions within selected arc portions of said groove means so that said end portion prepared areas face radially outwardly, collectively defining a light-emitting area,
   a plurality of stator fibers each having a first pickup end, said pickup ends being grouped into a radial symmetric array of selectively inwardly directed multistrand fiber blocks which collectively comprise a pickup area,
   stator means for mounting said fiber pickup ends in said radially symmetic, selectively inwardly directed array concentrically about said circular groove means defining said pickup area so that said light-emitting area rotates concentrically therein whereby an optic signal transmitted from the source through the rotor fibers is picked up by said stator fibers, and
   each stator fiber having a second end grouped in a collective bundle for coupling the light signal picked up by said stator fibers to the stator detector.

8. An optical slip ring assembly for coupling an optic signal from a rotor source to a stator detector, the assembly comprising:
   a rotor optic fiber having a first end for coupling with the optic signal source and a second end portion having one side progressively removed so that both the width and the depth of the removed area increases along the length of the fiber to form a light-emitting area of a selected length,
   cylindrical rotor means having a circular groove means for mounting said fiber second end portion therein so that said light-emitting area faces radially outwardly, the length of the light-emitting area of the rotor fiber substantially equaling the circumferential dimension of the circular groove means so that when the rotor fiber is mounted, said light-emitting area forms a circle, a plurality of stator fibers each having a first pickup end, said pickup ends being grouped into a radial symmetric array of selectively inwardly directed multistrand fiber blocks which collectively comprise a pickup area, stator means for mounting said fiber pickup ends in said radially symmetric, selectively inwardly directed array concentrically about said circular groove means defining said pickup area so that said light-emitting area rotates concentrically therein whereby an optic signal transmitted from the source through the rotor fiber is picked up by said stator fibers, and each said stator fiber having a second end grouped in a collective bundle for coupling the optic signal picked up by said stator fibers to the stator detector.

9. An optical slip ring assembly for coupling an optic signal from a rotor source to a stator detector, the assembly comprising:

a rotor optic fiber having a first end for coupling with the optic signal source and a second end portion having one side progressively removed so that both the width and the depth of the removed area increases along the length of the fiber to form a light-emitting area of a selected length, cylindrical rotor means having a circular groove means for mounting said fiber second end portion therein so that said light-emitting area faces radially outwardly, a plurality of stator fibers each having a first pickup end, said pickup ends including a radial symmetric array of wedge-shaped coupler blocks, each coupled to at least one stator fiber which collectively comprise a pickup area, stator means for mounting said fiber pickup ends in a radially symmetric, selectively inwardly directed array concentrically about said circular groove means defining said pickup area so that said light-emitting area rotates concentrically therein whereby an optic signal transmitted from the source through the rotor fiber is picked up by said stator fibers, and each said stator fiber having a second end grouped in a collective bundle for coupling the optic signal picked up by said stator fibers to the stator detector.

10. An optical slip ring assembly for coupling an optic signal from a rotor source to a stator detector, the assembly comprising:

a plurality of rotor optic fibers each having a first end for collective coupling with the optic signal source and a second end portion having one side progressively removed so that both the width and the depth of the removed area increases along the length of the fiber to form an area of a selected length from which light is emitted, cylindrical rotor means having a circular groove means for mounting said fiber second end portions within selected arc portions of said groove means so that said end portion prepared areas face radially outwardly, collectively defining a light-emitting area, a plurality of stator fibers each having a first pickup end, said pickup ends including a radial symmetric array of wedge-shaped coupler blocks, each coupled to at least one stator fiber which collectively comprise a pickup area, stator means for mounting said fiber pickup ends in a radially symmetric, selectively inwardly directed array concentrically about said circular groove means defining said pickup area so that said light-emitting area rotates concentrically therein whereby an optic signal transmitted from the source through the rotor fibers is picked up by said stator fibers, and each stator fiber having a second end grouped in a collective bundle for coupling the light signal picked up by said stator fibers to the stator detector.

11. An optical slip ring assembly for coupling an optical signal from a rotor source to a stator detector, the assembly comprising:

a rotor optic fiber having a first end for coupling with the optic signal source and a second end portion having one side progressively removed so that both the width and the depth of the removed area increases along the length of the fiber to form a light-emitting area of a selected length, cylindrical rotor means having a circular groove means for mounting said fiber second end portion therein so that said light-emitting area faces radially outwardly, the length of the light-emitting area of the rotor fiber substantially equaling the circumferential dimension of the circular groove means so that when the rotor fiber is mounted, the light-emitting area forms a circle, a plurality of stator fibers each having a first pickup end, said pickup ends including a radial symmetric array of wedge-shaped coupler blocks, each coupled to at least one stator fiber which collectively comprise a pickup area, stator means for mounting said fiber pickup ends in a radially symmetric, selectively inwardly directed array concentrically about said circular groove means defining said pickup area so that said light-emitting area rotates concentrically therein whereby an optic signal transmitted from the source through the rotor fiber is picked up by said stator fibers, and each said stator fiber having a second end grouped in a collective bundle for coupling the optic signal picked by said stator fibers to the stator detector.

* * * * *